3,107,251
CERTAIN N-(2-THIAZOLYL) CARBAMIC
ACID ARYL ESTERS
Horace D. Brown, Plainfield, Alexander R. Matzuk, Colonia, and Lewis H. Sarett, Princeton, N.J., assignors to Merck & Co., Inc., Rahway, N.J., a corporation of New Jersey
No Drawing. Filed Nov. 19, 1959, Ser. No. 854,026
6 Claims. (Cl. 260—306.8)

This invention relates to substituted ureas. More particularly the invention relates to 5-nitrothiazole derivatives of urea and substituted ureas which are useful in the treatment and prevention of harmful protozoal and histomonal infections in fowl and to methods of preparing the same. It also relates to processes for the production of intermediates useful in preparing the above compounds and to the intermediates thus produced.

According to the present invention, it has been found that compounds of the general formula

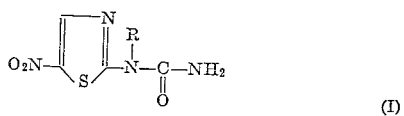

(I)

wherein R is hydrogen or methyl, have useful medicament properties and are particularly useful in the treatment and prevention of enterohepatitis (blackhead) in turkeys.

The compound N-(5-nitro-2-thiazolyl) urea represented by the above formula where R is hydrogen may be prepared by reaction 2-aminothiazole with an arylchloroformate in a basic medium to form the corresponding N-(2-thiazolyl) carbamic acid aryl ester. The aryloxy group is then removed by reaction with ammonia at elevated temperatures yielding the compound N-(2-thiazolyl) urea. This compound is then nitrated to form the desired N-(5-nitro-2-thiazolyl) urea. The equation representing the above reactions may be represented as follows:

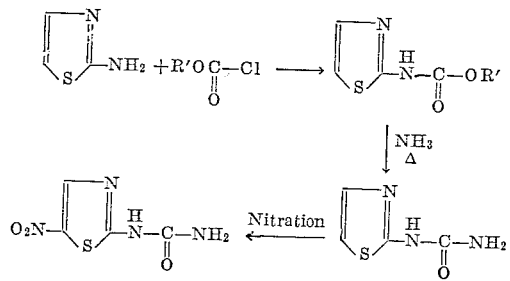

In the above equation R' is an aryl radical having from 6 to 10 carbon atoms.

With further regard to Formula I, the N,N-disubstituted urea of this invention, i.e., where R is methyl, may be prepared by reacting N-(5-nitro-2-thiazolyl) urea with a methylating agent in the presence of a strong base.

Examples of the arylchloroformates which may be used as reagents in the process of the invention are phenylchloroformate, m-tolylchloroformate, o-tolylchloroformate, p-tolylchloroformate, 2,4-dimethylphenylchloroformate, 2,5-dimethylphenylchloroformate, α-naphthylchloroformate and β-naphthylchloroformate. Other arylchloroformates such as 2,3-dimethylphenylchloroformate and 2,6-dimethylphenylchloroformate may also be used.

The arylchloroformates cited above may be prepared by reacting phosgene with the corresponding aryl alcohol using processes heretofore described in the literature. Thus, for example, phenylchloroformate may be prepared by reacting phosgene with phenol according to the process disclosed in Methoden der Organischen Chemie, volume 3, p. 104.

The reaction between the 2-aminothiazole and the arylchloroformate is carried out in a substantially anhydrous basic solvent medium. Preferably the solvent is an organic solvent. The tertiary amines such as pyridine, quinoline, and triethylamine are particularly desirable and preferred as solvents. In the event that the organic solvent is not a base the solvent is made basic by the addition of a basic compound preferably in anhydrous form. Examples of suitable basic compounds for this purpose are sodium ethoxide, sodium methoxide and the like. The ratio of reactants employed is not critical but for practical reasons equal molar quantities are employed. The reaction is exothermic and proceeds satisfactorily without the need for cooling or the application of additional heat. However, for practical reasons it is desirable to maintain the temperature of the mixture during the addition of the arylchloroformate in the range of from 0° to 50° C. and preferably below 35° C. This can be done, for example, by either cooling the reaction vessel containing one of the reactants prior to and during the addition of the other or by adding one of the reactants to the vessel containing the other very gradually. The reaction is generally complete after from 1 to 12 hours or more according to the concentration of reactants and particular arylchloroformate employed.

The reaction between the 2-aminothiazole and the arylchloroformate results in an intermediate N-(2-thiazolyl) carbamic acid aryl ester which precipitates out from the reaction mixture on standing at room temperature or when quenched with water and can be readily recovered by filtration or other conventional methods.

Among the N-(2-thiazolyl) carbamic acid aryl esters which may be formed according to the present invention are the phenyl, o-tolyl, m-tolyl, p-tolyl, 2,4-dimethylphenyl, 2,5-dimethylphenyl, 2,3-dimethylphenyl, 2,6-dimethylphenyl, α-naphthyl and β-naphthyl esters of N-(2-thiazolyl) carbamic acid.

The N-(2-thiazolyl) carbamic acid aryl ester is then reacted in a closed system (bomb, sealed tube or other suitable receiver) at elevated temperatures, preferably but not necessarily in the presence of a solvent, with at least one molecular equivalent and preferably an excess of ammonia.

Illustrative of the solvents which may be employed in carrying out the reaction are the lower aliphatic alcohols such as methanol, ethanol, propanol, isopropanol and the butyl alcohols. However, other solvents which are capable of solubilizing the N-(2-thiazolyl) urea as formed during the reaction may also be used. The reaction is carried out at a temperature of at least 50° C. and preferably in the range of from about 90° C. to about 100° C. The reaction goes to completion in from about 4 hours to 12 hours or more according to the reaction temperature and particular ester employed. In general though, reaction times of from 4 to 6 hours are sufficient to complete the reaction at 100° C.

In carrying out the above reaction the ammonia may be added to the system as a liquid or gas. When the ammonia is added as a gas it is, of course, necessary to calibrate the receiver in order to determine how much gas must be added to provide the desired concentration of ammonia in the system.

The reaction between the N-(2-thiazolyl) carbamic acid aryl ester and ammonia results in the production in high yields of the intermediate N-(2-thiazoyly) urea. The high yield of N-(2-thiazolyl) urea obtained is attributable to the fact that in the reaction of ammonia with the N-(2-thiazolyl) carbamic acid aryl ester, where the aryl radical is as defined herein, preferential cleavage of the ester to the corresponding aryl alcohol and N-(2- thiazolyl) urea is obtained. The N-(2-thiazolyl) urea thus obtained can be readily recovered as a solid by evaporating the reaction mixture to dryness.

In the next step of the process the N-(2-thiazolyl) urea is converted to the N-(5-nitro-2-thiazolyl) urea. This is done by reacting N-(2-thiazolyl) urea in the presence of concentrated sulfuric acid with at least a molar equivalent of nitric acid. The reaction with nitric acid is highly exothermic and although it proceeds satisfactorily without the need for cooling it is desirable for practical reasons to maintain the temperature of the mixture during the addition of the nitric acid in the range of from 0° to 35° C. and preferably below 30° C. This can be done, for example, by either cooling the reaction vessel prior to and during the addition of the nitric acid or by adding the nitric acid very gradually. The reaction proceeds rapidly and appreciable amounts of the product are obtained after several minutes. The reaction is generally complete after 1 to 2 hours. The solid N-(5-nitro-2-thiazolyl) urea can be recovered by pouring the reaction mixture over ice and filtering off the precipitated product.

In the preparation of the N-(5-nitro-2-thiazolyl) urea it is essential that the nitro group be introduced into the 5-position of the thiazole ring subsequent to the amination step as shown herein. If the nitro group is introduced into the 5-position of the thiazole ring prior to the amination step the desired compound will not be obtained in appreciable amounts.

The N-methyl-N-(5-nitro-2-thiazolyl) urea compound of this invention may be conveniently produced by reacting N-(5-nitro-2-thiazolyl) urea with a methylating agent, such as, for example, methyl iodide or dimethyl sulfate in the presence of a strong base. Other methyl halides such as methyl bromide, methyl chloride and the like may also be used. However, the preferred methylating agent is methyl iodide. Strong bases such as sodium hydroxide, potassium hydroxide or the equivalent may be employed in carrying out the above reaction.

In accordance with this procedure N-(5-nitro-2-thiazolyl) urea is suspended in acetone and sodium hydroxide is added at room temperature. In addition to acetone other solvents which are capable of solubilizing the desired product as formed during the reaction may be employed as the reaction medium. Illustrative of such solvents are methyl ethyl ketone, dioxane, tetrahydrofuran and 1,2-dimethoxyethane. The mixture is then reacted with a methylating agent such as methyl iodide or dimethyl sulfate to form N-methyl-N-(5-nitro-2-thiazolyl) urea. The ratio of reactants employed, namely, N-(5-nitro-2-thiazolyl) urea, base and methylating agent, is not critical but for practical reasons substantially equal molar quantities of these reactants are employed. The reaction proceeds at ordinary room temperature but if desired elevated temperatures such as the reflux temperature of the reaction mixture may be used. The reaction goes to completion in from about ½ hour to 12 hours or more according to the reaction temperature, concentration of reactants and particular methylating agent employed.

As previously stated, the N-(5-nitro-2-thiazolyl) urea and N-methyl-N-(5-nitro-2-thiazolyl) urea compounds of this invention have important anti-protozoal activity and are particularly valuable in the veterinary field. Thus, when administered in concentrations of about 0.015 to 0.3%, and preferably 0.02 to 0.1%, in the diet, the compounds are effective in the treatment and prevention of blackhead in turkeys.

The following examples are intended to be illustrative only and may be varied or modified without departing from the spirit and scope of this invention.

EXAMPLE 1

*Preparation of the Phenyl Ester of N-(2-Thiazolyl) Carbamic Acid*

To a solution containing 5.0 g. of 2-aminothiazole dissolved in 30 ml. of substantially anhydrous pyridine was added with stirring 7.8 g. of phenylchloroformate. After complete addition of the phenylchloroformate the reaction mixture was allowed to stand overnight at room temperature. The precipitate which formed was then recovered by filtration and washed first with water, then with 2.5 N hydrochloric acid and again with water. The phenyl ester of N-(2-thiazolyl) carbamic acid thus obtained was then dried to constant weight.

EXAMPLE 2

*Preparation of the Phenyl Ester of N-(2-Thiazolyl) Carbamic Acid*

12.0 g. of 2-aminothiazole was dissolved in 50 ml. of substantially anhydrous pyridine and the resulting solution cooled in an ice bath. 18.8 g. of phenylchloroformate was then slowly added with stirring maintaining the temperature of the mixture below 50° C. After complete addition of the phenylchloroformate the reaction mixture was allowed to stand at room temperature for about 16 hours. The precipitate which formed was then recovered by filtration and washed with water and 2.5 N hydrochloric acid. The product was then recrystallized first from ethanol and then from acetone. The phenyl ester of N-(2-thiazolyl) carbamic acid thus obtained had a melting point of 181°–184° C.

EXAMPLE 3

*Preparation of the p-Tolyl Ester of N-(2-Thiazolyl) Carbamic Acid*

To a solution containing 5 g. of 2-aminothiazole dissolved in 10 ml. of substantially anhydrous quinoline was added with stirring 9.0 g. of p-tolylchloroformate. After complete addition of the p-tolylchloroformate the reaction mixture was allowed to stand at room temperature for about 3 hours. The reaction mixture was then quenched with 50 ml. of water and the precipitate which formed recovered by filtration. The p-tolyl ester of N-(2-thiazolyl) carbamic acid thus obtained was washed well with water, 2.5 N hydrochloric acid, water and then dried to constant weight.

EXAMPLE 4

*Preparation of the 2,4-Dimethylphenyl Ester of N-(2-Thiazolyl) Carbamic Acid*

To a solution containing 10 g. of 2-aminothiazole dissolved in 25 ml. of substantially anhydrous triethylamine was added with stirring 18.5 g. of 2,4-dimethylphenylchloroformate. After complete addition of the 2,4-dimethylphenylchloroformate the reaction mixture was allowed to stand at room temperature for about 2 hours. The reaction mixture was then quenched with 50 ml. of water and the precipitate which formed recovered by filtration. The 2,4-dimethylphenyl ester of N-(2-thiazolyl) carbamic acid thus obtained was washed with water, 2.5 N hydrochloric acid, water and then dried to constant weight.

EXAMPLE 5

*Preparation of the 2,5-Dimethylphenyl Ester of N-(2-Thiazolyl) Carbamic Acid*

The procedure of Example 4 was followed and 10 g. of 2-aminothiazole was reacted with 18.5 g. of 2,5-dimethylphenylchloroformate to produce the 2,5-dimethylphenyl ester of N-(2-thiazolyl) carbamic acid.

EXAMPLE 6

*Preparation of the α-Naphthyl Ester of N-(2-Thiazolyl) Carbamic Acid*

5 g. of 2-aminothiazole was dissolved in 50 ml. of dioxane containing 2.7 g. of sodium methoxide. To the resulting mixture was added with stirring 10 g. of α-naphthylchloroformate. After complete addition of the α-naphthylchloroformate the reaction mixture was allowed to stand at room temperature for about 3 hours. The reaction mixture was then quenched with 50 ml. of water and the precipitate which formed recovered by filtration. The solid α-naphthyl ester of N-(2-thiazolyl) carbamic acid thus obtained was washed with water and dried to constant weight.

EXAMPLE 7

*Preparation of N-(2-Thiazolyl) Urea*

To a bomb containing 11.3 g. of the phenyl ester of N-(2-thiazolyl) carbamic acid and 50 ml. of ethanol was added 100 ml. of liquid ammonia. The bomb was then sealed and the reaction mixture heated for 6 hours at 100° C. The resulting dark brown solution was then evaporated to dryness. The crystalline residue that remained was washed with ether and recrystallized from acetone. The N-(2-thiazolyl) urea thus obtained changed from plates to needles without melting at 191° C. and decomposed at 280–290° C.

EXAMPLE 8

*Preparation of N-(2-Thiazolyl) Urea*

To a bomb containing 10 g. of the phenyl ester of N-(2-thiazolyl) carbamic acid was added 200 ml. of liquid ammonia. After complete addition of the ammonia the bomb was sealed and the mixture heated for 12 hours at 50° C. The resulting solution was evaporated to dryness and the remaining residue washed with ether. The N-(2-thiazolyl) urea thus obtained was then dried to constant weight.

EXAMPLE 9

*Preparation of N-(2-Thiazolyl) Urea*

To a bomb containing 2.3 g. of the p-tolyl ester of N-(2-thiazolyl) carbamic acid was added 30 ml. of liquid ammonia. After complete addition of the ammonia the bomb was sealed and the mixture heated for 12 hours at 75° C. The resulting solution was evaporated to dryness and the remaining residue washed with ether. The N-(2-thiazolyl) urea thus obtained was then dried to constant weight.

EXAMPLE 10

*Preparation of N-(2-Thiazolyl) Urea*

To a bomb containing 5.0 g. of the 2,4-dimethylphenyl ester of N-(2-thiazolyl) carbamic acid and 25 ml. of isopropanol was added 20 ml. of liquid ammonia. The bomb was then sealed and the reaction mixture heated for 6 hours at 90° C. The resulting solution was evaporated to dryness and the remaining residue washed with ether. The N-(2-thiazolyl) urea thus obtained was then dried to constant weight.

EXAMPLE 11

*Preparation of N-(2-Thiazolyl) Urea*

To a bomb containing 5.0 g. of the 2,5-dimethylphenyl ester of N-(2-thiazolyl) carbamic acid and 20 ml. of methanol was added 20 ml. of liquid ammonia. The bomb was then sealed and the reaction mixture heated for 6 hours at 100° C. The resulting solution was evaporated to dryness and the remaining residue washed with ether. The N-(2-thiazolyl) urea thus obtained was then dried to constant weight.

EXAMPLE 12

*Preparation of N-(2-Thiazolyl) Urea*

To a bomb containing 8.1 g. of the α-naphthyl ester of N-(2-thiazolyl) carbamic acid and 50 ml. of isopropanol was added 100 ml. of liquid ammonia. The bomb was then sealed and the reaction mixture heated for 6 hours at 100° C. The resulting solution was evaporated to dryness and the remaining residue washed with a small volume of methanol. The N-(2-thiazolyl) urea thus obtained was air dried to constant weight.

EXAMPLE 13

*Preparation of N-(5-Nitro-2-Thiazolyl) Urea*

4.2 g. of N-(2-thiazolyl) urea was dissolved in 15 ml. of concentrated sulfuric acid and the mixture cooled in an ice bath. 1.3 ml. of fuming nitric acid was then added with stirring. After complete addition of the nitric acid, the mixture was stirred for 1 hour and then poured on ice. The bright yellow precipitate which formed was recovered by filtration, washed with cold water, air dried to constant weight and recrystallized from acetone. The N-(5-nitro-2-thiazolyl) urea thus obtained had a melting point greater than 340° C.

EXAMPLE 14

*Preparation of N-Methyl-N-(5-Nitro-2-Thiazolyl) Urea*

9.4 g. of N-(5-nitro-2-thiazolyl) urea was suspended in 250 ml. of 1,2-dimethoxyethane. Then 4.0 g. of powdered sodium hydroxide (100% purity) was added to the stirred slurry at room temperature. To the resulting suspension was added 14.2 g. of methyl iodide with continuous stirring. The resulting mixture was allowed to stand for 12 hours at room temperature, filtered and the residue remaining washed with 1,2-dimethoxyethane. The combined 1,2-dimethoxyethane filtrate was then evaporated to dryness and the residue remaining washed well with water. The N-methyl-N-(5-nitro-2-thiazolyl) urea thus obtained was air dried to constant weight.

EXAMPLE 15

*Preparation of N-Methyl-N-(5-Nitro-2-Thiazolyl) Urea*

18.8 g. of N-(5-nitro-2-thiazolyl) urea was suspended in 500 ml. of acetone. Then 5.9 g. of powdered potassium hydroxide (100% purity) was added to the stirred slurry at room temperature. To the resulting suspension was added 13.2 g. of dimethyl sulfate with continuous stirring. The resulting mixture was allowed to stand overnight at room temperature, filtered and the residue remaining washed with acetone. The combined acetone filtrate was then evaporated to dryness and the residue remaining washed well with water. The N-methyl-N-(5-nitro-2-thiazolyl) urea thus obtained was air dried to constant weight.

Various changes and modifications of the invention can be made, and to the extent that such variations incorporate the spirit of the instant invention, they are intended to be included within the scope of the appended claims.

What is claimed is:

1. A compound of the formula

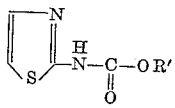

wherein R′ is an aryl radical having from 6 to 10 carbon atoms.

2. N-(2-thiazolyl) carbamic acid phenyl ester.
3. A tolyl ester of N-(2-thiazolyl) carbamic acid.
4. A dimethylphenyl ester of N-(2-thiazolyl) carbamic acid.
5. A naphthyl ester of N-(2-thiazolyl) carbamic acid.
6. The process which comprises reacting 2-aminothiazole in a substantially anhydrous basic medium with a compound having the formula

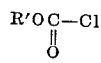

wherein R' is an aryl radical having from 6 to 10 carbon atoms to form a compound having the formula
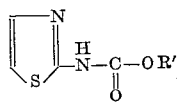
References Cited in the file of this patent
UNITED STATES PATENTS
| | | |
|---|---|---|
| 2,755,285 | O'Neill et al. | July 17, 1956 |
| 2,829,084 | O'Neill et al. | Apr. 1, 1958 |
| 2,850,503 | O'Neill et al. | Sept. 2, 1958 |